UNITED STATES PATENT OFFICE.

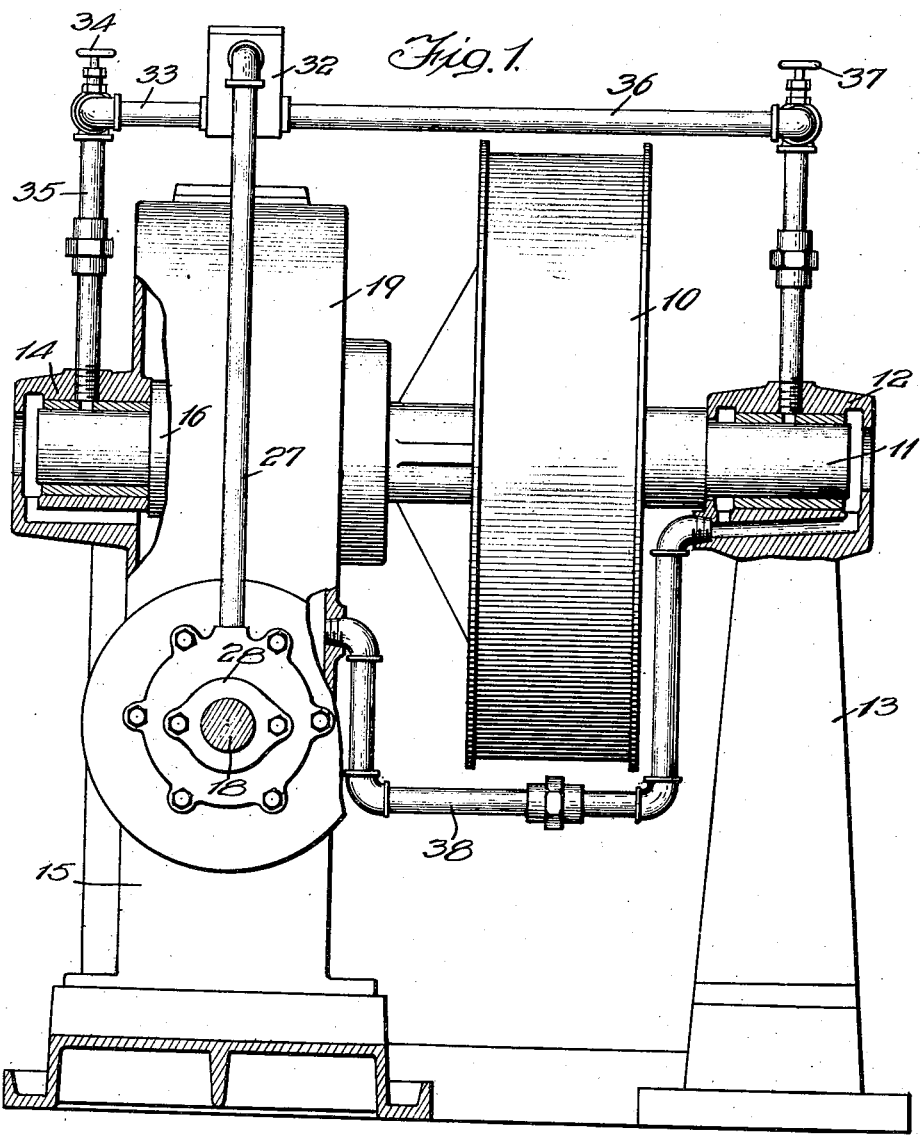

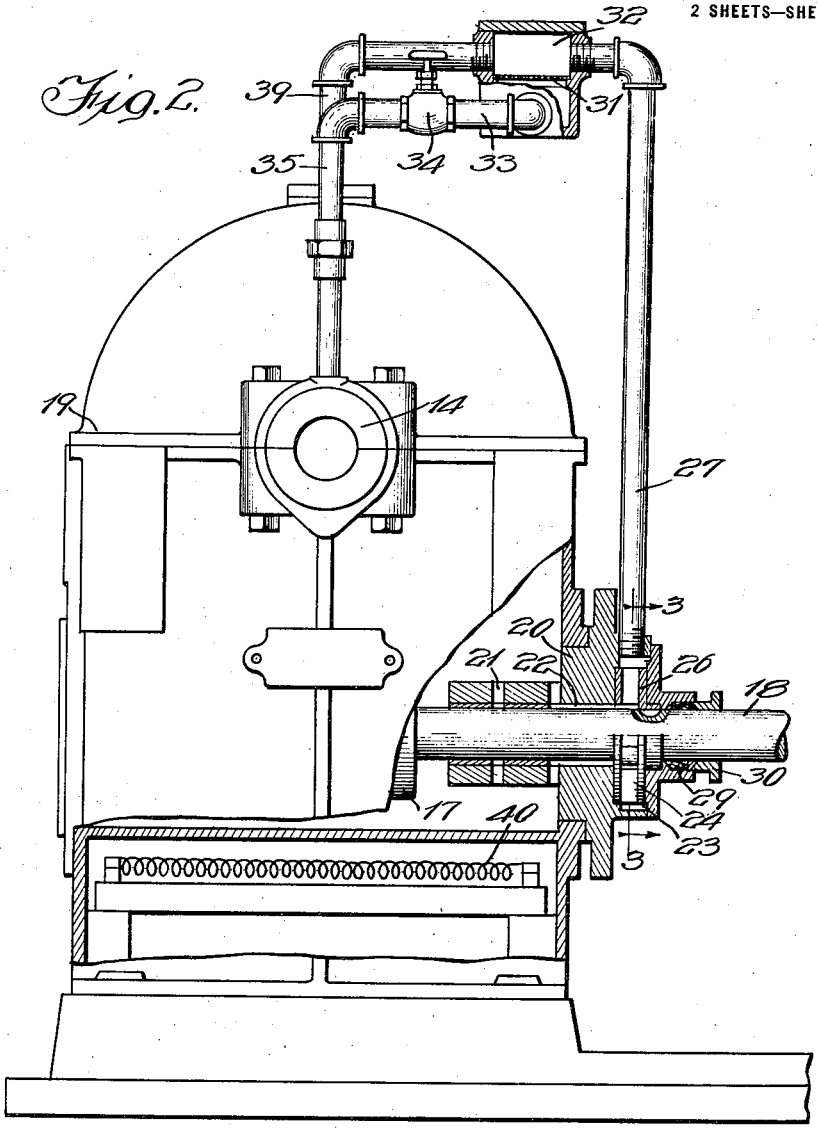
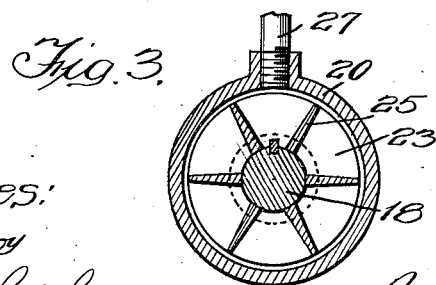

FRANK A. HECHT, JR., OF CHICAGO, ILLINOIS.

OILING SYSTEM FOR ELEVATORS.

1,347,854. Specification of Letters Patent. Patented July 27, 1920.

Application filed July 3, 1919. Serial No. 308,476.

*To all whom it may concern:*

Be it known that I, FRANK A. HECHT, Jr., a citizen of the United States, residing at Chicago, in the county of Cook and State of Illinois, have invented certain new and useful Improvements in Oiling Systems for Elevators, of which the following is a specification.

My device relates to a lubrication system and is especially intended for use in connection with the hoisting machinery at the top of an elevator well, although it is applicable to any machine where a rotating shaft extends into an oil reservoir below the level of the oil.

One object of my invention is to prevent leakage of oil around the stuffing box of such a shaft.

A special object is to provide a continuous supply of filtered oil for the main bearings of the drum shaft.

My invention also includes the use of a heating coil to maintain the temperature of the oil relatively constant in cold weather.

In the accompanying drawings Figure 1 is a side elevation and Fig. 2 an end elevation of a common type of elevator hoisting mechanism showing the application of my invention thereto. Fig. 3 is a detail section on the line 3—3 of Fig. 2.

As illustrated in the drawings, a hoisting drum 10 is carried by a main shaft 11 suitably supported in bearings 12 and 14 on standards 13 and 15 respectively. Adjacent the bearing 14 the shaft carries a large worm wheel, the hub of which may be seen at 16 in Fig. 1 meshing with a worm 17 (see Fig. 2) on the end of a shaft 18 driven by any suitable means, such for instance as an electric motor having its armature built up on said shaft. The worm 17 and the worm wheel 16 are completely inclosed in an oil-tight casing 19 and oil sufficient to cover the worm for constant lubrication thereof is placed in said casing.

In the devices of the prior art much difficulty was encountered in preventing the leakage of oil around the motor shaft in hot weather. Devices of this character are also frequently installed in penthouses at the top of a building where they are not heated and in winter the cold is apt to thicken the oil so that proper lubrication cannot be maintained. I have shown a bearing 20 carrying the shaft 18 having a plurality of radial holes 21 extending in to the shaft and communicating with axially extending passageways 22 leading to a chamber 23 containing a two-way centrifugal pump 24. The pump 24 comprises, in the present embodiment, merely a plurality of radial partitions 25 between a pair of plates 26, suitably keyed to the shaft 18. Upon rotation of the motor shaft, the oil in the chamber 23 will be rotated and the centrifugal force resulting will force oil through the outlet tube 27.

A suitable stuffing box 28 comprising stuffing material 29 and a tightening gland 30 is mounted on the outside of the chamber 23 and when the shaft is not rotating provides a satisfactorily oil-tight closure for the casing. When the shaft is rotated it is immaterial whether the bearing remains perfectly oil-tight or not, as the suction at the center of the casing 23 produced by the centrifugal pump 24 results in a pressure more or less below that of the outside atmosphere.

Means are provided for filtering a portion of the oil supplied by the pump and supplying it to the main bearings of the hoisting drum. I have shown a filter plate 31 mounted on a suitable casing 32 into which the outlet pipe 27 from the pump discharges. From the lower portion of the casing below the filter plate, filtered oil may be led through a pipe 33 controlled by a suitable valve 34 down a vertical pipe 35 into the left-hand main bearing, as shown in Fig. 1. This bearing is inclosed in the casing 19 so that surplus oil dripping from it will return to the supply at the bottom of the casing. A similar pipe 36 conducts filtered oil from the casing 32 through a valve 37 downwardly into the bearing 12 at the other end of the main drum from which it is returned through a suitable set of pipes 38 to the casing. A considerable portion of the oil supplied by the pump 24, being in excess of the requirements of the main bearings 12 and 14, flows from the filter casing 32 through a pipe 39 and falls down on the upper side of the worm wheel 16.

Any suitable means may be provided to maintain the oil in the reservoir at a proper temperature during cold weather. I have illustrated a resistance 40 mounted in the base of the standard 15 adapted to heat the standard and the oil contained therein. A suitable thermostat for controlling the heating current may be used if desirable.

It will be seen that I have provided automatic means for supplying oil to the bearings of the hoisting drum whenever the elevator is operated, and that I have so constructed this oil supply means as to prevent leakage through the packing for the motor shaft. A suitable heating apparatus to prevent freezing of the oil in cold weather is particularly desirable in a device of this sort, as the centrifugal pump shown could not handle a frozen or solidified oil. While I have shown and described in detail a preferred embodiment of my invention, it should be clearly understood that the description is for purposes of illustration only, and that my invention is not limited to any of the precise details disclosed not definitely recited in the appended claims.

I claim as my invention:

1. In a device of the class described, in combination, a main shaft, a drive shaft, gearing connecting said two shafts, a casing inclosing said gearing, oil in said casing, said drive shaft entering said casing below the oil level and said main shaft entering said casing only above the oil level, and an oil supply system adapted to maintain various pressures of oil at varying points, said system being so arranged that the point where said drive shaft enters said casing is a point of low pressure.

2. In a device of the class described, in combination, a main shaft, a drive shaft, gearing connecting said two shafts, a casing inclosing said gearing, oil in said casing, said drive shaft entering said casing below the oil level, and an oil supply system adapted to maintain varying pressures of oil at varying points, said system being so arranged that the point where said drive shaft enters said casing is a point of low pressure.

3. In a device of the class described, a main shaft and a drive shaft, gearing adapted to transmit power between said drive shafts, a casing inclosing said gearing, oil in said casing, said drive shaft entering said casing below the oil level, a stuffing box for said drive shaft, and a centrifugal pump on said drive shaft between said stuffing box and said oil reservoir adapted to take oil from said reservoir and deliver it by centrifugal force.

4. The combination recited in claim 3 in which said pump is operative upon rotation of said drive shaft in either direction.

5. In a device of the class described a casing, a drive shaft entering said casing, oil in said casing, maintained at a level above said drive shaft, a packing for said drive shaft and a centrifugal pump adjacent said packing adapted to reduce the pressure on said packing and also to supply oil to a transmission mechanism.

6. In a device of the class described, a casing, oil in said casing, a drive shaft extending into said casing below the oil level, a bearing for said drive shaft, a stuffing box at the outer end of said bearing, passage-ways in the inner portion of said bearing communicating with the oil in said casing, axially extending passage-ways in said bearing extending along said shaft to a point adjacent said stuffing box, and an annular chamber encircling said shaft adjacent said stuffing box and containing a centrifugal oil pump.

7. In a device of the class described, a main shaft and a drive shaft, gearing adapted to transmit power between said shafts, a casing inclosing said gearing, oil in said casing, an oil pump driven by said drive shaft, a filter box adapted to receive oil from said pump, means for delivering oil from said filter to each of the main bearings of said main shaft, and means for returning an excess supply of oil directly to said casing.

8. In a device of the class described, a casing, power transmission in said casing, a pump adapted to deliver oil from said casing to an element requiring lubrication, and a heater adapted to maintain the oil in fluid form in cold weather.

9. In power equipment, in combination, a casing, a reversible motor having a drive shaft and a centrifugal pump mounted on said drive shaft where it enters said casing and operative upon rotation of said shaft in either direction.

10. In power equipment, a rotatable drive shaft, a bearing member for said drive shaft, packing at one end of said bearing member, said bearing member having an annular chamber encircling said shaft adjacent said packing, and a pair of ring shaped plates spaced apart by radially extending partitions and keyed to said shaft to rotate in said chamber.

11. In power equipment, in combination, a main shaft, a transmission for driving said main shaft, two standards having bearings for said main shaft, one of said standards embodying a casing inclosing said transmission, a drive shaft entering said casing, a pump driven by said drive shaft and adapted to deliver oil from said casing, a filter box adapted to receive oil from said pump, means for conducting oil from said filter box to the bearings in each of said standards and an overflow adapted to discharge oil supplied by said pump in excess of the requirements of said main bearings into said casing upon said transmission.

12. The combination recited in claim 11 in which said pump is centrifugal and adapted to operate upon rotation of said drive shaft in either direction and in combination with a packing on said drive shaft adjacent said pump and a heater below said casing adapted to heat said casing and the oil contained therein.

In testimony whereof, I have hereunto set my hand.

FRANK A. HECHT, Jr.